United States Patent
Brunold et al.

(10) Patent No.: US 11,820,035 B2
(45) Date of Patent: Nov. 21, 2023

(54) DEVICE AND METHOD FOR PROCESSING DRINKS CLOSURE CAPS

(71) Applicants: FINATEC HOLDING AG, Brugg bei Biel (CH); PACKSYS GLOBAL AG, Rut (CH)

(72) Inventors: Attila Brunold, Hinwil (CH); Pascal Friedli, Walkringen (CH); Martin Hurlimann, Rotherbach (CH); Simon Kessler, Lobsingen (CH); Dominik Roth, Port (CH); Pascal Choquard, Brugg bei Biel (CH)

(73) Assignees: FINATEC HOLDING AG, Brugg Bei Biel (CH); PACKSYS GLOBAL AG, Rut (CH)

( * ) Notice: Subject to any disclaimer, the term of this patent is extended or adjusted under 35 U.S.C. 154(b) by 248 days.

(21) Appl. No.: 17/422,662

(22) PCT Filed: Jan. 17, 2020

(86) PCT No.: PCT/EP2020/051128
§ 371 (c)(1),
(2) Date: Jul. 13, 2021

(87) PCT Pub. No.: WO2020/148428
PCT Pub. Date: Jul. 23, 2020

(65) Prior Publication Data
US 2022/0126474 A1    Apr. 28, 2022

(30) Foreign Application Priority Data

Jan. 17, 2019   (DE) ..................... 10 2019 101 207.4

(51) Int. Cl.
*B26D 5/00* (2006.01)
*B26D 7/10* (2006.01)
(Continued)

(52) U.S. Cl.
CPC ............... *B26D 5/007* (2013.01); *B26D 7/10* (2013.01); *B26F 1/0053* (2013.01); *G01N 21/909* (2013.01); *B26F 2210/04* (2013.01)

(58) Field of Classification Search
CPC ........ B26D 5/007; B26D 7/10; G01N 21/909; B26F 2210/04
See application file for complete search history.

(56) References Cited

U.S. PATENT DOCUMENTS

| 4,511,054 A | 4/1985 | Shank |
| 7,800,009 B2 | 9/2010 | Gochar, Jr. |

(Continued)

FOREIGN PATENT DOCUMENTS

| CN | 101670533 A | 3/2010 |
| CN | 101817163 A | 9/2010 |

(Continued)

OTHER PUBLICATIONS

International search report for corresponding PCT application No. PCT/EP2020/051128, dated May 8, 2020.

*Primary Examiner* — Omar Flores Sanchez
(74) *Attorney, Agent, or Firm* — Notaro, Michalos & Zaccaria P.C.

(57) ABSTRACT

A device for processing drinks closure caps having at least one cutting unit with at least one cutting blade and a detection unit which, in turn, has a camera as well as at least one conveying device forming a transport path to and from the cutting unit is disclosed. In order to solve the problems of known devices, the detection unit has an optical system and is arranged operatively downstream of the cutting unit such that it fully captures the inner wall of a drinks closure cap located in its field of vision.

14 Claims, 6 Drawing Sheets

(51) Int. Cl.
*B26F 1/00* (2006.01)
*G01N 21/90* (2006.01)

(56) References Cited

U.S. PATENT DOCUMENTS

| | | | | |
|---|---|---|---|---|
| 8,225,939 | B2 * | 7/2012 | Nelson | B07C 5/342 |
| | | | | 209/552 |
| 9,539,619 | B2 * | 1/2017 | Kujacznski | G01N 21/8901 |
| 10,094,785 | B2 * | 10/2018 | Offenborn | G01B 11/2425 |
| 10,207,297 | B2 * | 2/2019 | Nygaard | G01N 21/8806 |
| 10,300,510 | B2 * | 5/2019 | Kujacznski | B07C 5/36 |
| 2007/0092590 | A1 * | 4/2007 | Bonzi | B26D 7/06 |
| | | | | 414/222.01 |
| 2009/0107896 | A1 | 4/2009 | Gochar, Jr. | |
| 2012/0200849 | A1 | 8/2012 | Balducci et al. | |
| 2018/0038804 | A1 * | 2/2018 | Buchwald | G01N 21/8806 |
| 2018/0172603 | A1 * | 6/2018 | Piana | G01B 11/24 |
| 2019/0352035 | A1 * | 11/2019 | Eggl | B67C 3/007 |

FOREIGN PATENT DOCUMENTS

| | | |
|---|---|---|
| CN | 102284887 A | 12/2011 |
| CN | 105856304 A | 8/2016 |
| DE | 102016205451 A1 | 10/2017 |
| EP | 1243520 A1 | 9/2002 |
| EP | 1633540 B1 | 3/2007 |
| EP | 3363767 A1 | 8/2018 |
| WO | 2011058500 A1 | 5/2011 |
| WO | 2016032060 A1 | 3/2016 |
| WO | 2018036857 A1 | 3/2018 |
| WO | 2018203159 A1 | 11/2018 |

* cited by examiner

DEVICE AND METHOD FOR PROCESSING DRINKS CLOSURE CAPS

The present invention relates to a device for processing drinks closure caps and to a related method.

The drinks closure caps, which are usually formed as multilayer plastic bodies, generally have a tamper-evident ring which is created during the manufacturing process of the drinks closure cap. Plastic tamper-evident rings are formed in the form of (partially) perforated rings, the perforation of which is injected into the closure blank by an embossing device or cut by means of cutting blades. It is also known to provide tamper-evident rings with a continuous, annular tab or a plurality of webs directed towards the bottle opening, which retain the tamper-evident ring on the bottle neck when opening the drinks closure cap and enable the tamper-evident ring to be separated from the remaining drinks closure cap.

After the drinks closure caps have been formed, they are fed to a cutting unit. This is usually a unit in which the drinks closure cap blanks are rotated along one or more blades, the respective cutting edge of which plunges into the closure cap material and cuts into or through it. Such a cutting blade has multiple interruptions of its concavely curved blade, so that the cutting process is regularly interrupted to produce the thin webs of the tamper-evident ring. In addition, a folding device arranged downstream of the cutting unit in the direction of production may be provided to fold the tab of the tamper-evident ring, which retains the tamper-evident ring on the neck of the bottle, thus allowing separation between the tamper-evident ring and the remaining drinks closure cap when opening the bottle. Such a known processing device also always has a transport path to and from the individual treatment stations, in particular formed by one or more conveyor belts or toothed wheels, between the teeth of which the drinks closure caps are guided.

In the course of the drinks closure cap manufacturing method, a plurality of quality checks is carried out which, among other things, inspect each individual drinks closure cap, in particular the tamper-evident ring, to ensure that it is complete and free of defects, the latter also including an inspection of the aforementioned cutting blade which is required for manufacturing the tamper-evident ring.

The number and type of inspection devices at various points along the production path significantly influence the space requirements of the drinks closure production device and also the production speed. The inspection processes must be designed in such a manner that they preferably do not slow down the production process, with product-related processing speeds of over 2,000 products/min currently being common, leaving less than 30 ms for the inspection devices per drinks closure cap to determine the quality of the drinks closure cap. The entire process of separating, inspecting, and sorting out the drinks closure caps therefore represents a significant bottleneck in the drinks packaging process and must be carried out in correspondingly quick and reliable manner.

A device for inspecting the cutting blade is known from EP 1 633 540 B1, in which a cutting blade is monitored by means of a camera, for which purpose the blade can be displaced from its operating position into the monitoring area of the camera. This represents a disadvantageous slowing down of the production process since production must be interrupted while the cutting blade is being inspected.

From WO 2011/058 500 A1 a cutting device with detection unit is known, in which a rotating carousel conveys plastic caps to a fixed blade which incorporates an annular weakening line into the caps. The carousel has a transmitter and a receiver that detect the presence or absence of a cutting edge of the fixed blade, thus, are aligned with the blade itself.

It is therefore an object of the present invention to solve the aforementioned problems of the prior art.

The object relating to the device is achieved by a device for processing drinks closure caps, comprising at least one cutting unit with at least one cutter, and a detection unit which, for its part, comprises a camera, as well as at least one conveying means forming a transport path to and from the cutting unit, wherein the detection unit comprises an optical system and is operatively arranged downstream of the cutting unit in such a manner that it fully detects the inner walls of a drinks closure cap located in its field of vision.

In contrast to the prior art, it is provided according to the invention that the quality of the cutter, preferably a cutting blade, is no longer carried out directly but rather indirectly by detecting the quality of the cut drinks closure caps, in particular from the condition of the inner walls of the drinks closure cap detected by means of a camera and an optical system. These inner walls include the shell surface and the cap base, which approximately form a cylinder closed on a base side. Preferably, the detection of the entirety of the inner surface is carried out here in a single image, wherein, according to the invention, the annular edge surface can also be counted among the inner surfaces. This can be achieved in particular by an arrangement in which the camera is positioned as close as possible to the transport path and in that the drinks closure caps passing through during operation are only at a slight distance from the camera, which distance is preferably no greater than the height of the drinks closure cap. According to the invention, the cutter is first of all any device which removes material from the drinks closure cap in a cutting or non-chipping manner, for example a laser, or a cutting blade.

The cutter according to the invention is particularly advantageously arranged in a wall of the transport path so that the drinks closure caps guided on this wall anyway can be machined by the cutter. Also in accordance with the invention are alternative or supplementary embodiments according to which, for example, the drinks closure caps can be guided individually in the cutting unit via a separating wheel with receiving pockets and fed to the cutter or pressed against the cutting blade. Alternatively, multiple cutters spaced apart from each other, in particular cutting blades, can be used. In this connection it is preferably provided according to the invention that the drinks closure caps are oriented on the transport path in such a manner that the top surface of the shell is oriented downwards, so that a camera located above the transport path can capture images of the interiors of the drinks closure caps. Spatial inversion is also in accordance with the invention, in particular when the conveying means are designed as vacuum belts, so that a camera located below the conveying path can look into the drinks closure caps.

With particularly great advantage, this device enables the inspection of quality and condition of the cutter based on the quality and condition of the cut products, therefore indirectly, so that the production device in the region of the cutters can be kept constructionally simple and the spatial placement of the inspection device consisting of camera and optical system is made possible where it can be placed in a space-saving, easily accessible and maintenance-friendly manner, thus spatially independent of the location of the cutting blade.

In a further development of the invention, it is provided that the optical system is a mirror arrangement, an optical fiber arrangement or a fisheye lens and/or that the cutter is a cutting blade. According to the invention, the optical system is configured in such a manner that the combination thereof with the camera enables the entire inner surface of the drinks closure cap to be captured. According to the invention, this is particularly preferably achieved by a fisheye lens, by which the invention first of all understands fisheye lenses of any design, but also such lenses which are able to capture the entire inner surface of the drinks closure cap, regardless of how spatially distorted this image may be. As already explained, cutting blades are preferred because of their simplicity and thus low cost; however, other cutters are also in accordance with the invention as long as they are suitable to operate in a cutting or non-chipping manner, accordingly, cutting in or out.

Likewise, in a further development of the invention, it is provided that a folding device is arranged on the transport path downstream of the cutting unit. The folding device folds the tab of the tamper-evident ring in such a manner that the tab retains the tamper-evident ring at the neck of the bottle, thus enabling separation between the tamper-evident ring and the remaining drinks closure cap when opening the bottle. The combination of the cutting and detection units according to the invention with the folding unit enables a more compact design of the overall device, since in this way, all aforementioned units can be arranged in a common housing.

In a further development of the invention, it is provided that the camera captures images in the wavelength range of visible light and/or infrared light. In these wavelength ranges, most plastics, but in particular those used for the manufacture of drinks closure caps, are not transparent to light or are transparent only to a limited extent so that the plastic layers produced by the cutting process, which are thinner compared to the remaining wall thickness, or holes in the drinks closure caps can be seen in the images captured by the camera. Short-wave infrared radiation is also suitable for detecting the perforated areas of the drinks closure caps.

If the detection unit has a data processing unit that processes the images captured by the camera, preferably in such a way that it detects and marks in the processed images the holes and/or the webs of the tamper-evident ring so that possible faulty embossments can be visually detected on the images even by a user without further effort. In any case, it is according to the invention that the data processing unit performs an automatic pattern recognition and keeps the detected patterns, in particular the position, length and number of radial and circumferential cutting edges, area brightnesses and the like, ready to be read out, evaluated, and graphically displayed by a software. The data of the interior of the drinks closure caps prepared in this way enable a user or a further data evaluation unit to draw conclusions about the quality of individual tamper-evident rings, and also to draw conclusions about the condition of the cutting blades or the cutting unit in general.

In a further development of the invention, it is provided that the device has one or more of the following: at least one illumination device which illuminates the outer walls and/or inner walls of the drinks closure caps, at least one optical filter, in particular arranged in front of the fisheye lens, a blade heater, a reject unit, a device for spatial orientation of the drinks closure caps, in particular a vacuum positioner, operating media lines and data lines. An illumination device is used to illuminate the drinks closure caps in the region of the detection unit on the outer walls, so that the holes of the tamper-evident ring in the interior of the drinks closure caps can be seen more clearly by the camera, as more light passes through at these walls due to the reduced material thickness. In doing so, the illumination device can directly illuminate the inner walls of the drinks closure caps. In this case, the illumination device is particularly preferably arranged next to the camera so that the illumination device can shine into the drinks closure cap. Illumination by infrared radiation is also according to the invention, in particular when using an infrared camera. Illumination of the inner walls is also advantageous according to the invention, in particular if the material of the drinks closure cap reflects the light particularly well so that the less reflective areas of the drinks closure cap indicate thinner walls or else holes. The illumination device is required whenever the incident light at the operating location of the device is not sufficient to obtain high quality images of the inner surfaces of the cap. Optical filters are understood to be in particular those that improve the detectability of the holes and thin spots at the wall in the drinks closure caps. For example, polarizing filters, color filters or neutral density filters can be used as optical filters. A blade heater is particularly advantageous when the at least one cutting blade is worn since adjusting the temperature of the cutting blades improves its cutting ability and thus prevents premature replacement of a cutting blade that is only partially worn. This reduces maintenance times and increases the maintenance interval. A reject unit is sorting out the defective drinks closure caps detected by the data processing unit. According to the invention, this is done mechanically or by means of compressed air. The reject unit is arranged downstream of the detection unit and optionally upstream or downstream of the folding device. A reject unit with a further inspection device can also be provided downstream of the folding unit so that it can also detect faulty folds of individual drinks closure caps and reject them. A positioner is particularly advantageous if the transport path before or after the embossing and cutting units is to merge into a transport path of a connected device, for example a packaging device or closure device, with differently oriented conveyance of the drinks closure caps. In this context, operating media lines can connect air extractors or compressed air, as well as other operating media, to the device if required. Data lines enable a wired connection of the detection unit and in particular the data processing unit to an external data evaluation unit or a database.

In a further development of the invention, it is provided that the positioner is a vacuum positioner or vacuum belt. Particularly advantageously, these positioners are designed as vacuum positioners since complicated transport paths and conveyor belts are avoided in this way and a space-saving alternative is made possible.

In one configuration of the invention, it is advantageously provided that the camera is arranged between the cutting unit and the folding device, in particular above the transport path. The arrangement of the camera above the transport path simplifies the conveying means since in this way no complicated transport paths of the drinks closure caps have to be implemented upside down above a camera and the drinks closure caps rest on a conveying means. Arranging the camera between the cutting unit and the folding unit makes it possible to detect tamper-evident rings that are faulty anyway so that drinks closure caps with faulty tamper-evident rings can either pass through the folding unit without being folded or can be sorted out beforehand by a reject unit. Likewise, it is advantageous to detect possible defects caused by the cutting device or defects in the cutting blades as early as possible so that the number of defective tamper-evident rings is kept within limits and maintenance can be initiated at an early stage. Above all, however, this arrangement of the camera allows the use of structurally unchanged cutting and folding devices and is space-saving and maintenance-friendly.

Finally, in a further development of the invention, it is advantageously also provided that the detection unit performs automatic pattern detection and reports drinks closure caps detected as having been cut incorrectly to the reject unit. According to the invention, it is also of particularly great advantage that it is not the cutting blade itself that is checked for possible defects but rather the cutting edges produced by the blade in the interior of the drinks closure caps. This makes it possible to dispense with a detection unit at the cutting blade location and to detect both the defective drinks closure caps and possible wear on the cutting blade via just a single detection unit. The defective drinks closure caps are preferably sorted out by the reject unit before they pass through the folding unit so that a possible bottleneck caused by a folding unit can be prevented. As pattern detection, edge detection in particular is advantageous and according to the invention since the analysis of the edges is sufficient to obtain conclusions about the quality of the cut edges of the drinks closure caps.

The object relating to the method is achieved by a method for detecting incorrectly cut drinks closure caps, in particular using a device described above, at least comprising the following steps: —passing a drinks closure cap intermittently cut at a cutting blade through the field of vision of a camera with a fisheye lens while capturing an image of the complete inner walls of the drinks closure cap, —performing automatic pattern detection in the image of the inner walls of the drinks closure cap, and—evaluating the detected patterns with regard to the condition of the cutting blade.

As already explained, with the method according to the invention, an evaluation of the condition of the cutting blade is carried out from a product treated by the blade and thus independently of its own condition monitoring. For this purpose, in a first step, the drinks closure caps are moved as close as possible along the detection unit, in particular the camera with fisheye lens, so that the camera can detect the entire interior of the drinks closure caps through the fisheye lens. It is also according to the invention that the drinks closure caps only pass the detection unit after they have passed through the cutting unit, preferably directly after leaving the cutting unit. Thus, the detection unit can detect defects in the drinks closure caps at an early stage and dispose of them accordingly at an early stage by a reject unit and output a necessary maintenance signal in the event of more pronounced wear of the cutting blades. This maintenance signal is preferably generated and displayed/forwarded by a data processing unit which processes the images captured by the detection unit and performs the pattern detection in the second method step. The data processing unit can be integrated in the detection unit or connected externally to the detection unit by data lines. Of particularly great advantage is the feature essential to the invention according to which an evaluation of the cuts in the drinks closure caps is used to draw conclusions about the at least one cutting blade.

In a further development of the invention it is provided in the method that in the step of automatic pattern detection one or more elements are detected and in particular recorded, which elements are selected from the group formed by: number of radially extending edges, arcuate distance between radially equal edges, number and length of arcuately extending edges, brightness of edges and image defects. These evaluation criteria enable a variable and precise evaluation of the image data and assessment of the quality of the cuts. The number of radially extending edges provides information about the possible absence of individual cutting edges of the cutting blade, and the arcuate distance between radially identical edges provides information about wear at the two arcuate ends of the cutting blades or at the corresponding recesses of the cutting blade. The other patterns mentioned also allow conclusions to be drawn about the condition of the blade, so that the possible wear thereof can be detected precisely and with a high degree of certainty.

In further development of the method according to the invention it is provided that the condition of the cutting blade with regard to blade length, blade width, dimension of the cutting depth setting is determined from the edge-related information and these current conditions are also recorded. These condition characteristics of the cutting blades enable problem-related maintenance, wherein, for example, maintenance of a cutting blade of which the blade length has normal values can be delayed by adjusting the temperature of the cutting blade.

In a further development of the method it is provided that in the case of the cutting blade, a reference variable temperature and/or setting is regulated as a function of the blade's determined current condition by means of a control variable, or the blade is marked as being ready to be replaced. This prevents unnecessary or premature maintenance work and loss of time of the device. In particular, adjusting the temperature of the cutting blade(s) is advantageous because the plastic-machining cutting blades can still serve their purpose even when the cutting blades are blunted, as long as their temperature is raised. In the case of cutting blades whose wear has exceeded a certain level, according to the invention, a maintenance signal is output so that the device can be stopped and the cutting blades requiring maintenance can be replaced.

Finally, in a further development of the method, it is also provided that development trends are determined from the recorded current conditions of the cutting blade, and before or upon reaching or exceeding limit values or limit value ranges, either a control variable is automatically determined or a need for action is signaled to a user. The development trends evaluated on a continuous basis enable predictive maintenance, for example at times when production is less busy anyway. In general, users and persons servicing the device are thus much more flexible in scheduling maintenance for the production process.

The invention is described by way of example in a preferred embodiment with reference to a drawing, wherein further advantageous details are to be taken from the figures in the drawing.

Functionally identical parts are provided with the same reference signs.

In the figures of the drawing, in each case individually.

Figure 1A:
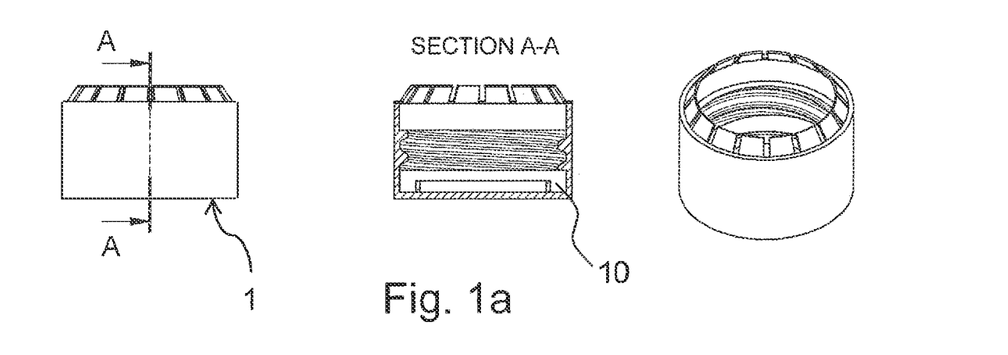
FIG. 1a shows a drinks closure cap before passing the cutting and folding devices.
Figure 1B:
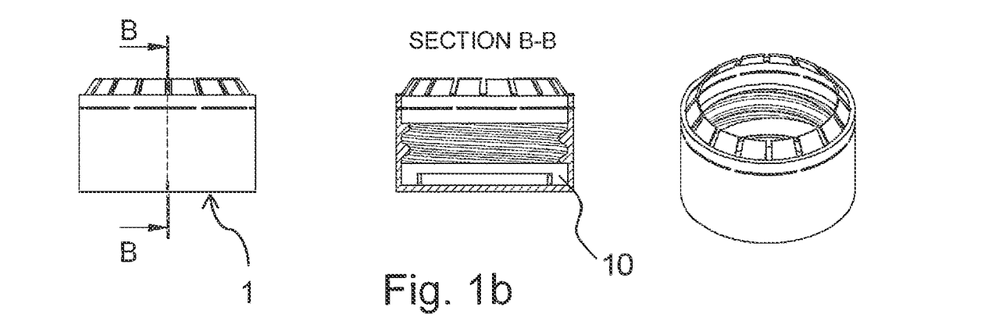
FIG. 1b shows a drinks closure cap after passing the cutting unit and before passing the folding unit.
Figure 1C:
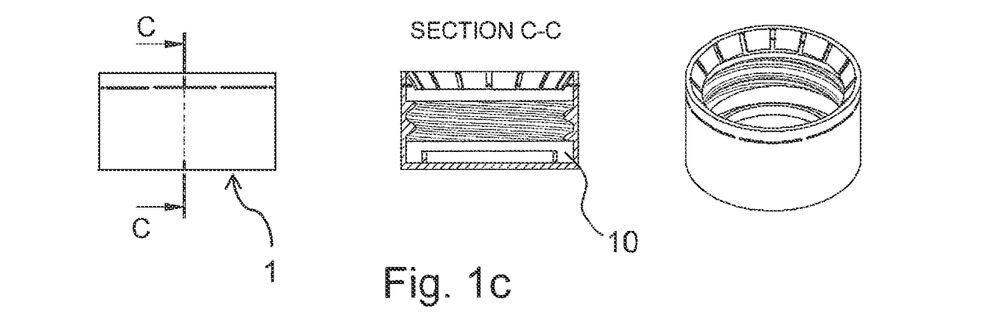
FIG. 1c shows a drinks closure cap after passing the cutting and folding device.

FIG. 1a shows a drinks closure cap 1 before passing the cutting and folding devices in a side view, sectional view, and perspective view. These three views are also shown in FIGS. 1b to 1c. Accordance to the invention, the drinks closure cap 1 already has a screw thread in the interior 10 as a result of the production method connected upstream of the cutting unit 2. At this point in the production method, the tamper-evident ring is incorporated into the drinks closure cap 1. The webs of the tamper-evident ring, which are folded in the direction of the bottle opening when a bottle is closed and generate a counterforce against the removal of the drinks closure cap 1 when opening the bottle, are already formed on the drinks closure cap 1 at the production stage shown here. Here, the webs are formed annularly on the cylinder edge of the open side of the drinks closure cap and point towards each other in a roof-like manner such that they project into the top surface.

FIG. 1b shows a drinks closure cap 1 after passing the cutting unit and before passing the folding unit. Grooves have been machined all around the drinks closure cap 1 by the cutting unit, each of which grooves defines a predetermined breaking point of the tamper-evident ring. The cutting unit has at least one cutting blade which has multiple recesses in its blade so that a drinks closure cap guided in a rotating manner along the cutting edge is intermittently cut, and the tamper-evident ring remains connected to the remaining drinks closure cap 1 by narrow interruptions in the grooves, which represent the predetermined breaking points. As shown in the schematic view of the drinks closure cap 1, the grooves can be formed so as to extend through the outer surface of the drinks closure cap 1 or be formed only as a blind hole.

FIG. 1c shows a drinks closure cap 1 after passing the folding device. The folding device has folded the webs into the interior 10 in the direction of the closed side of the drinks closure cap 1 so that they can exert their desired effect when opening a bottle. The webs may overlap the grooves in the interior 10, as shown in the sectional view, or they may not extend beyond them. The exact formation of the webs and the exact arrangement of the grooves are to be selected based on the bottles.

Figure 2:
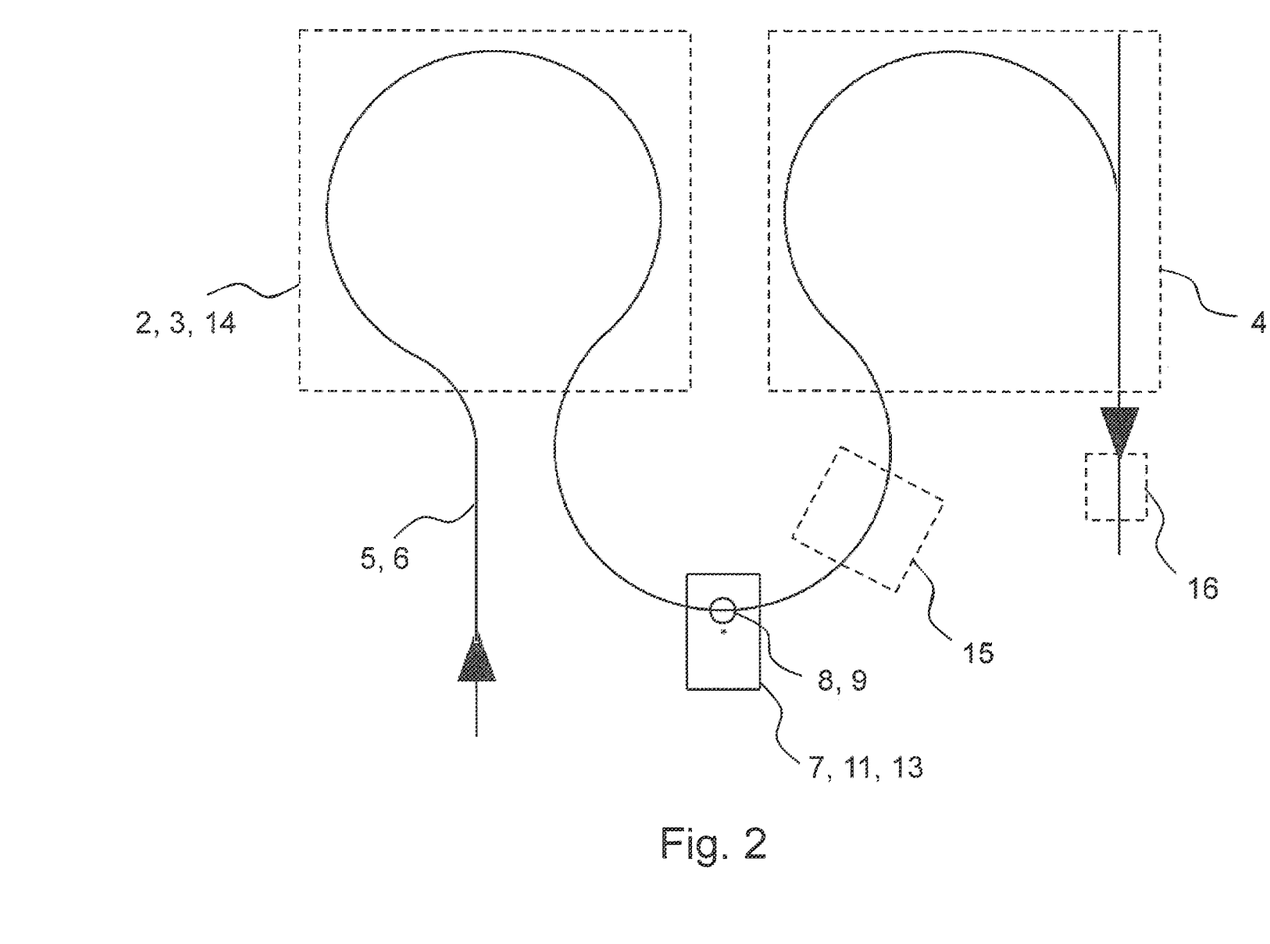
FIG. 2 shows a transport path of the drinks closure cap.

FIG. 2 schematically shows the arrangement of the invention in a device for processing drinks closure caps and, in particular, also the transport path 5 of the drinks closure cap 1 according to the invention, the conveying direction of which is indicated by two arrows. Coming from a device for the primary forming of the drinks closure caps, which is not shown, the drinks closure caps are guided by the conveying means 6 of the transport path 5 into and through a cutting unit 2 which has at least one cutting blade past which the drinks closure caps are guided and in the process of this are rotated and cut in an intermittent manner. The cutting blades 3 of the cutting unit 2 are preferably equipped with blade heaters 14 which, according to the invention, can be controlled in such a manner that in the case of slight wear on the cutting blades 3, their temperature is adjusted to compensate for the wear.

After leaving the cutting unit 2, the transport path 5 leads to the detection unit 7 according to the invention. The latter, if possible, is advantageously arranged directly behind the cutting unit 2 in order to save space in this way. The detection unit 7 is equipped with or connected to a data processing unit 11 which processes the images of the drinks closure cap 1 captured by the detection unit 7, in particular by a camera 8 provided in the detection unit 7, and, if no external device is provided for this purpose, evaluates and stores the images. According to the invention, the detection unit 7 communicates with the blade heaters 14 so that they are regulated in accordance with the detected wear. Furthermore, the detection unit 7 is advantageously designed to communicate with a reject unit 15 which, according to the invention, is arranged particularly advantageously on the transport path 5 between the detection unit 7 and the folding device 4.

According to the invention, the detection unit 7 is designed in such a manner that, in addition to drawing conclusions about the cutting blades 3 from summarized temporal trends from a plurality of images of a wide variety of drinks closure caps 1, it naturally also detects and evaluates individual drinks closure caps 1 so that a corresponding signal is sent to the reject unit 15 for each drinks closure cap 1 that is found to be defective. Depending on the orientation of the drinks closure caps 1, the camera 8 of the detection unit 7 is arranged directly and centrally above or below the transport path 5, so that the camera captures images of the interior of the drinks closure caps 1. For this purpose, the camera 8 is equipped with a fisheye lens 9 which enables capturing an image of the complete interior of the drinks closure caps 1, including the shell surface of the interior. Other lenses are also according to the invention, provided that they can capture the entire interior with only one image. In addition, the camera 8 or the detection unit 7 can be equipped with optical filters 13 so that optimized images can be captured depending on the configuration, color, and illumination of the drinks closure caps 1 under the detection unit 7.

Viewed in the conveying direction downstream of the detection unit 7, a folding station 4 is arranged.

In the further course of the transport path 5, if required, a drinks closure caps orientation device 16 can be arranged to orient the drinks closure caps 1 according to the needs of subsequent production stations. An arrangement of the drinks cap orientation device 16 can be provided at the beginning or at the end of the transport path 5. An arrangement between several elements of the device shown in FIG. 2 is also conceivable, provided that unusual space conditions require a spatial redesign of the device. The transport path 5 is configured with the largest possible radius, in particular in the cutting unit 2 and the folding unit 4, since the drinks closure caps 1 have a high speed due to the high production numbers, and the resulting centrifugal forces can be absorbed more easily in the case of a transport path 5 with large radii. In this case, both the cutting unit 2 and the folding unit 4 are not necessarily extended over an entire transport radius as shown by the dashed rectangles but can rather assume sizes corresponding to the detection unit 7 shown.

Figure 3:
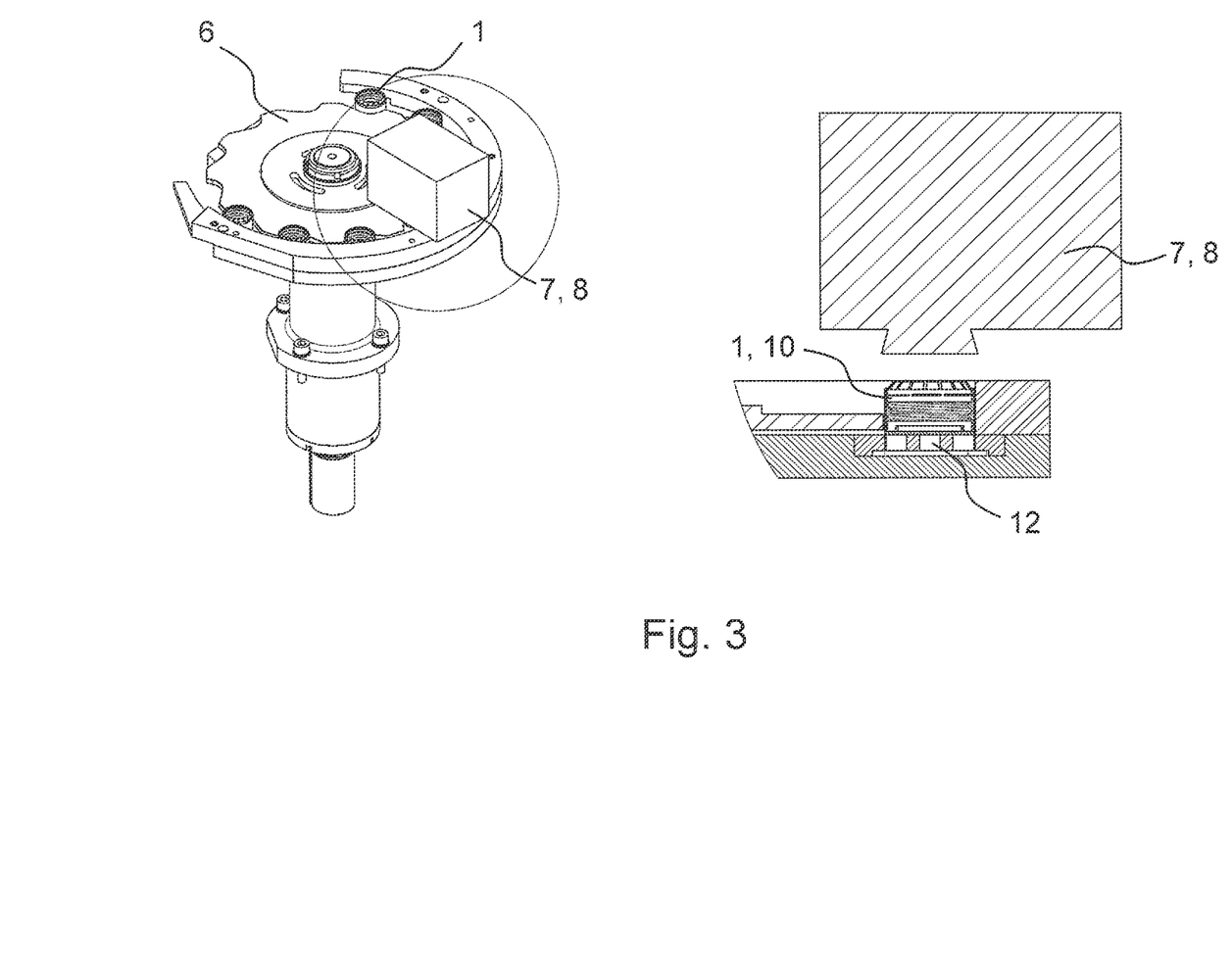
FIG. 3 shows a detection unit.

FIG. 3 shows a detection unit 7 according to the invention in two partial images in a perspective view and a sectional view. The conveying means 6 shown here are designed as a rotating gear wheel, the recesses of which represent the receptacles for the drinks closure caps 1. Alternatively to this design of the conveying means 6, conveyor belts, vacuum belts and other conveying means are also according to the invention. The conveying means 6 transport the drinks closure caps 1 below the detection unit 7 in such a manner that the camera 8 of the detection unit 7 captures the interior 10 of the drinks closure caps 1. For that matter, the conveying means 6 further comprise an outer wall which absorbs the centrifugal forces of the extremely highly accelerated drinks closure caps 1. To optimize image capture, an illumination device 12 which illuminates the drinks closure caps 1 from the outside or from the inside can be provided in the viewing area of the camera 8 below and/or above the passing drinks closure caps 1. An illumination device 12 directly illuminating the shell surface of the drinks closure caps 1 is also of great advantage since it can significantly improve the imaging quality of the grooves of the tamper-evident ring. For that matter, the light of the illumination device 12 should be selected such that the camera 8 achieves the best imaging qualities. For example, an IR light is advantageous for IR cameras.

Figure 4A:
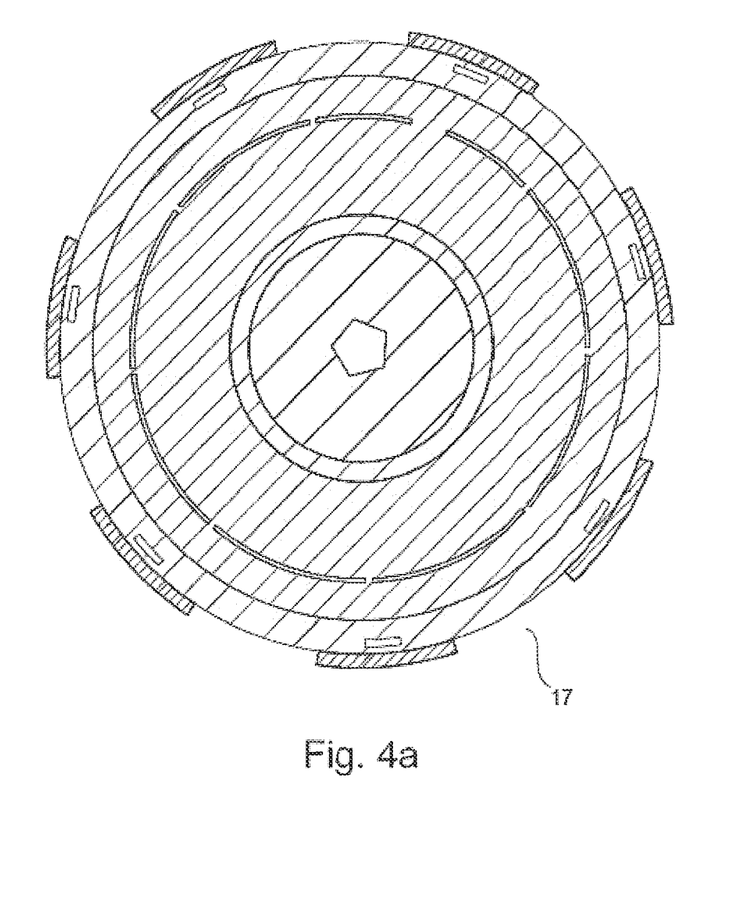
FIG. 4a shows an image of a drinks closure cap.

FIG. 4a shows an image 17 of a drinks closure cap captured by the camera. This image 17 represents the unprocessed imaging of the camera showing the drinks cap in optical light. Due to the fisheye lens, the captured interior of the drinks closure cap appears distorted such that in particular the shell surface and the structures incorporated therein are clearly visible in their entirety. In particular, the grooves of the tamper-evident ring can be seen, which are not covered by the webs due to the arrangement of the camera on the transport path just in front of the folding device. The light areas in the shell surface represent the grooves, as these are flooded with light due to the illumination device, while the dark interruptions represent the predetermined breaking points of the tamper-evident ring. For example, the brightness of the grooves, the width of the grooves and interruptions, and the distances between them can be used to draw conclusions about the quality of the cutting blades and the tamper-evident ring itself. The automatic pattern detection detects the edges and uses them to determine the condition of the cutting blades.

Figure 4B:
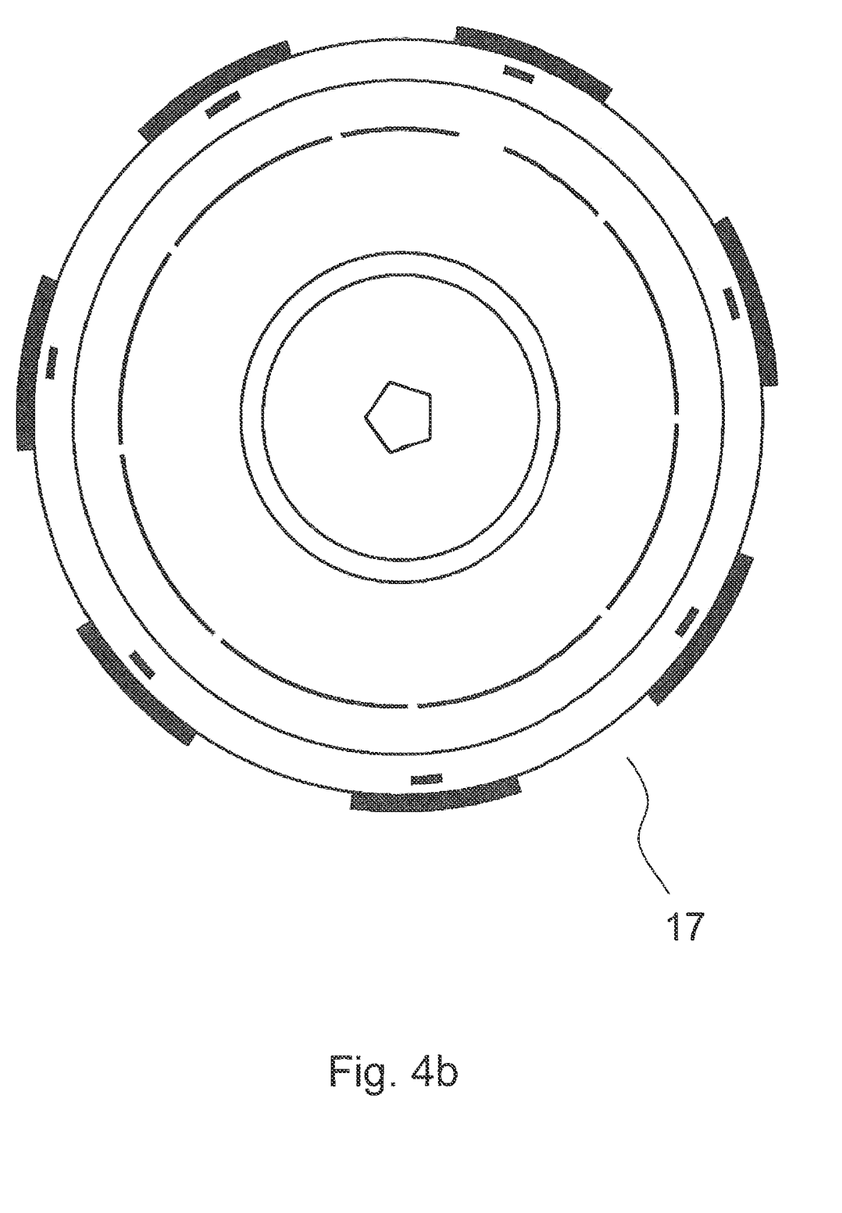
FIG. 4b shows an image of a drinks closure cap in raw data.

FIG. 4b shows an image 17 of a drinks closure cap in raw data. In this image 17, which represents the image 17 after evaluation by a data processing unit, the contrast differences, in particular those in the direction of the circular arc, are highlighted. Thus, in particular, the interruptions of the grooves of the tamper-evident ring are marked, which already allow conclusions about the cleanliness of the tamper-evident ring.

Figure 4C:
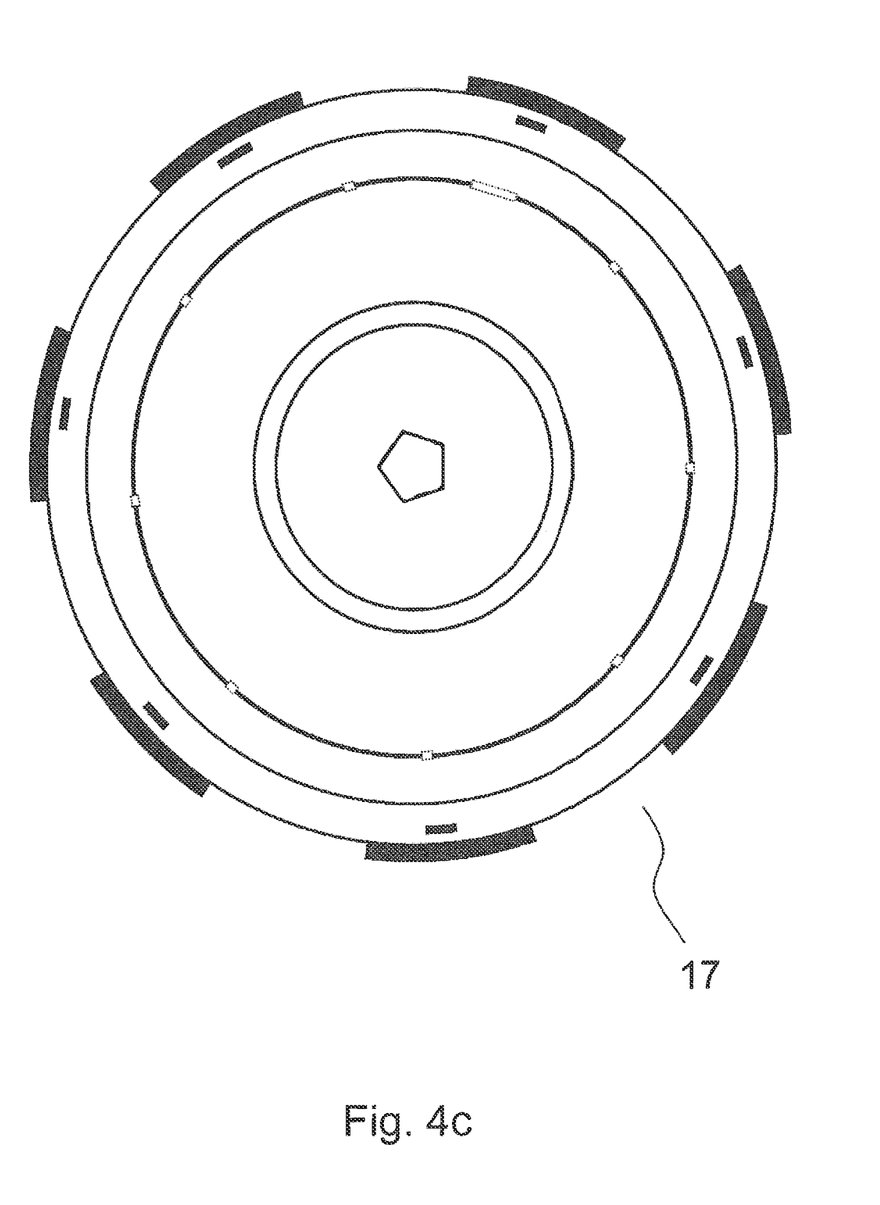
FIG. 4c shows an image of a drinks closure cap in raw data with evaluation markings.

FIG. 4c shows an image 17 of a drinks closure cap with evaluation markings. The interruptions of the grooves highlighted in FIG. 4b are marked by dots in the image 17 shown here. For this purpose, an area of the shell surface has been restricted such that the grooves of the tamper-evident ring can be found in this area. This area can be calculated by a user or by machine using the height of the drinks closure caps and the height of the cutting blades of the cutting unit.

Due to the marked interruptions of the grooves, any defects can be detected manually without further interpretation of the images and can be evaluated in large quantities by software.

REFERENCE LIST

1 Drinks closure cap
2 Cutting unit
3 Cutter
3a Cutting blade
4 Folding device
5 Transport path
6 Conveying means
7 Detection unit
8 Camera
9 Optical system
10 Inner wall
11 Data processing unit
12 Illumination device
13 Optical filter
14 Blade heater
15 Reject unit
16 Positioner
17 Image

The invention claimed is:

1. A device for processing drinks closure caps comprising:
   at least one cutting unit (2) with at least one cutter (3);
   a detection unit (7) which comprises a camera (8);
   at least one conveying means (6) forming a transport path (5) to and from the cutting unit (2); and
   wherein the detection unit (7) comprises an optical system (9), wherein the detection unit (7) is operatively arranged downstream of the cutting unit (2) to fully detect the inner walls (10) of a drinks closure cap (1) located in field of vision of the detection unit (7).

2. The cutting and detection device according to claim 1, wherein the optical system (9) is a mirror arrangement, an optical fiber arrangement, or a fisheye lens, and wherein the cutter (3) is a cutting blade (3a).

3. The cutting and detection device according to claim 1, wherein a folding device (4) is arranged on the transport path (5) downstream of the cutting unit (2).

4. The cutting and detection device according to claim 1, wherein the camera (8) captures images in the wavelength range of visible light and/or infrared light.

5. The cutting and detection device according to claim 1, wherein the detection unit (7) comprises a data processing unit (11) which processes the images captured by the camera (8).

6. The cutting and detection device according to claim 1, comprising one or more of the following: at least one illumination device (12) illuminating the outer walls and/or inner walls (10) of the drinks closure caps (1), at least one optical filter (13) arranged in front of the fisheye lens (9), a blade heater (14), a reject unit (15), a positioner (16), operating media lines and data lines.

7. The cutting and detection device according to claim 1, wherein the positioner (16) is a vacuum positioner or vacuum belt.

8. The cutting and detection device according to claim 1, wherein the camera (8) is arranged between the cutting unit (2) and a folding unit (4) above the transport path (5).

9. A device for processing drinks closure caps (1), comprising:
   at least one cutting unit (2) with at least one cutter (3);
   a detection unit (7) which comprises a camera (8);
   at least one conveying means (6) forming a transport path (5) to and from the cutting unit (2);
   wherein the detection unit (7) comprises an optical system (9), wherein the detection unit (7) is operatively arranged downstream of the cutting unit (2) to fully detect the inner walls (10) of a drinks closure cap (1) located in a field of vision of the detection unit (7); and
   wherein the detection unit (7) performs automatic pattern detection and reports drinks closure caps (1) detected as having been cut incorrectly to the reject unit (15).

10. A method for detecting incorrectly cut drinks closure caps using a device according to claim 1, comprising:
    passing a drinks closure cap (1) intermittently cut at a cutter (3) through the field of vision of a camera (8) with a fisheye lens (9) while capturing a complete image (17) of the inner walls (10) of the drinks closure cap (1),
    performing an automatic pattern detection in the image (17) of the inner walls (10) of the drinks closure cap (1),
    evaluating the detected patterns with respect to the condition of the cutter (3).

11. The method according to claim 10, in which in the step of automatic pattern detection, one or more elements are detected and in particular recorded, the elements being selected from the group formed by: number of radially extending edges, arcuate distance between radially equal edges, number and length of arcuately extending edges, brightness of edges and image defects.

12. The method according to claim 11, in which the condition of the cutter (3) is determined from the edge-related information and these current conditions are recorded, wherein the cutter is in particular a cutting blade (3a), and its blade length, blade width, dimension of the cutting depth setting and completeness of the blade are determined from the edge-related information.

13. The method according to claim 11, in which in the case of the cutting blade (3), a reference variable temperature and/or setting is regulated as a function of the blade's determined current condition by means of a control variable, or it is marked as being ready to be replaced.

14. The method according to claim 11, in which development trends are determined from recorded current conditions of a cutting blade (3a), and before or upon reaching or exceeding limit values or limit value ranges, either a control variable is determined automatically or a need for action is signaled to a user.

* * * * *

UNITED STATES PATENT AND TRADEMARK OFFICE
CERTIFICATE OF CORRECTION

PATENT NO. : 11,820,035 B2  
APPLICATION NO. : 17/422662  
DATED : November 21, 2023  
INVENTOR(S) : Attila Brunold et al.

Page 1 of 1

It is certified that error appears in the above-identified patent and that said Letters Patent is hereby corrected as shown below:

On the Title Page

Item (71), the second applicant's address is corrected to be "Rüti (CH)".

Item (73), the second assignee's address is corrected to be "Rüti (CH)".

Signed and Sealed this  
Fifteenth Day of July, 2025

Coke Morgan Stewart  
*Acting Director of the United States Patent and Trademark Office*